United States Patent [19]

Hatje

[11] Patent Number: 4,761,055

[45] Date of Patent: Aug. 2, 1988

[54] RETROREFLECTOR FOR THE REFLECTION OF ELECTROMAGNETIC RAYS

[75] Inventor: Günter H. Hatje, Hamburg, Fed. Rep. of Germany

[73] Assignee: Helmut K. Pinsch GmbH & Co.

[21] Appl. No.: 912,967

[22] Filed: Sep. 29, 1986

[30] Foreign Application Priority Data

Mar. 10, 1986 [DE] Fed. Rep. of Germany ... 8606540[U]

[51] Int. Cl.[4] ........................ G02B 5/26; G02B 5/122

[52] U.S. Cl. .................................... 350/103; 350/316; 350/102; 342/5; 343/909; 343/834

[58] Field of Search ............... 350/102, 103, 109, 316, 350/317, 1.6, 1.7, 164, 171, 172; 342/7, 5, 8; 343/781 R, 781 P, 833, 834, 909

[56] References Cited

U.S. PATENT DOCUMENTS

| | | | |
|---|---|---|---|
| 2,721,998 | 10/1955 | Holm | 342/8 |
| 3,153,235 | 10/1964 | Chatelain | 342/5 |
| 3,473,944 | 10/1969 | Dates | 350/1.7 |
| 4,006,730 | 2/1977 | Clapham et al. | 350/1.6 |
| 4,028,701 | 6/1977 | Parks et al. | 342/8 |
| 4,097,868 | 6/1978 | Borowick | 343/834 |
| 4,180,954 | 1/1980 | Gell, Jr. | 350/1.7 |
| 4,369,448 | 1/1983 | Satoh et al. | 342/5 |
| 4,416,509 | 11/1983 | Milan | 350/102 |
| 4,479,131 | 10/1984 | Rogers et al. | 343/909 |
| 4,480,256 | 10/1984 | Wren | 343/909 |
| 4,618,518 | 10/1986 | Pricone et al. | 350/102 |
| 4,686,150 | 8/1987 | Talley et al. | 342/5 |

*Primary Examiner*—John K. Corbin
*Assistant Examiner*—Loha Ben
*Attorney, Agent, or Firm*—Toren, McGeady & Associates

[57] ABSTRACT

Retroreflector for the reflection of electromagnetic rays suitable for destroying, by reflection or absorption, electromagnetic radiation, which could lead to a lasting detrimental influencing of magnetic or other data carriers. The retroreflector is constructed as a flat article formed from a base layer of metallic, juxtaposed reflectors with filter coatings applied thereto formed from a suitable metallic material, and provided with top coatings on a bottom surface and a top surface of the base layer.

2 Claims, 1 Drawing Sheet

RETROREFLECTOR FOR THE REFLECTION OF ELECTROMAGNETIC RAYS

BACKGROUND OF THE INVENTION

The present invention relates to a retroreflector for reflecting electromagnetic rays, which is suitable for destroying, by reflection or absorption, electromagnetic radiation, which could lead to a lasting influencing on magnetic or other data carriers, particularly as a protective device for data memories.

In modern computing and data processing installations, memories are used for storing information. These memories are, for example, constructed in central processing units of data processing installations or used as external memories. Use is generally made of the laws of electromagnetism for storing information. Thus, magnetic core, tape, bubble and drum memories are known.

In such memories, and, in particular, in read-only memories, information is frequently stored which is only present therein and to which no other access is possible. It has therefore proved to be a problem to protect such memories against damage and hence the destruction of the stored information material. It has admittedly already been proposed to arrange such memories in building rooms in which mechanical influencing of the memories is largely excluded. However, even in these rooms, it is not possible to ensure a completely effective protection against detrimental influences or destruction of the memories by the action of electromagnetic radiation.

Thus, if a velocity-modulated tube of corresponding power level is operated in the vicinity of a data memory, the electromagnetic radiation from the tube can detrimentally influence and/or destroy the data material, so that on again obtaining access to the data, it is established that the data memories only contain inadequate or no information.

SUMMARY OF THE INVENTION

An object of the present invention is to provide a retroreflector for reflecting electromagnetic rays, which is suitable for destroying, by reflection or absorption, electromagnetic radiation, which could have a lasting detrimental influence on magnetic or other data carriers, said retroreflector being locatable in the area around data carriers, so as to bring about a complete shielding of said data carriers against electromagnetic radiation.

According to the invention this object is achieved by a retroreflector of the aforementioned type, wherein the retroreflector is constructed as a flat article formed from a base layer of metallic, juxtaposed reflectors with filter coatings of a suitable metallic material applied thereto and with a top coating on the top and bottom surfaces thereof.

This retroreflector provides the possibility of offering optimum protection to data memories of any type against the detrimental influence of electromagnetic radiation, because with the aid of such a retroreflector, retroreflection takes place of the most varied wave types. With the reflectors in the base layer, a high reflection of the impacting electromagnetic radiation is achieved, in the manner of a triple or corner mirror in optics. As a result of the juxtaposed individual reflectors, they, in each case, act as a retrodirective reflector, a diffuse reflection only being obtained from the connecting edges of the individual reflectors. In order to bring about a reflection of all the wavelengths in question, e.g. from the X, S and VHF wave ranges, correspondingly formed filter coatings are provided on the base layer. Additional protection by radiation absorption results from the top coatings arranged on the top and bottom surfaces.

As a function of requirements, a foil constructed in this way can be located at any point on a building and placed around a data memory in such a way that a substantially secure protective sheath is obtained.

According to a preferred embodiment of the retroreflector, the base layer is constructed as a metal foil or sheet with pyramid point-like indentations or retractions with three boundary faces juxtaposed therein without gaps, the boundary faces of each indentation have on the engaging edges an angle of $\alpha=90°$.

The individual reflectors formed in this way, in which three edges abutting in a corner form a right angle to one another ensure that each individual incident electromagnetic beam is reflected on all three surfaces and travels back parallel to its direction of incidence. The base layer having the individual reflectors can be produced by stamping, punching, deep drawing, compression, etc., of a metal foil or sheet.

Preferably, the thickness of the filter coating is fixed in such a way that a broad-band X, S and VHF wave filter is formed, while being made from a metal or precious metal. This permits a specific adaptation of the filter coatings to the characteristics of the expected radiation to be reflected, the filter coatings preferably being formed from chromium, brass, silver and/or Mumetal (a high magnetic permeable iron alloy). The filter coatings can be individually arranged as prefabricated foils on the base layer or are formed by evaporation onto the base layer. Preferably, the top coatings are formed in the same way.

According to a preferred embodiment for arrangement on building walls and ceilings, the flat article is constructed as a surface-covering foil web with a lower top coating, suitable for placing on a wall, and an upper top coating suitable for placing wallpaper or emulsion on the flat article.

This construction makes it possible to use the flat article in place of wallpaper on room walls or ceilings and then apply conventional wallpaper thereto. Thus, the optical appearance of the walls and ceilings of rooms containing storage units is not altered, but nevertheless a high degree of protection is obtained. It is also possible to apply the flat article, e.g., to doors in this way.

According to a further preferred embodiment for arrangement placing on building floors, the flat article is constructed as a surface-covering foil web with a lower top coating suitable for placing and fixing to a floor and with an upper top coating suitable for receiving a carpet pile and with a base layer for absorbing static loading forces.

In this construction of the flat article, it can be used in place of a carpet on the floor and the data memory or memories to be protected can be placed thereon. Thus, with simple means, a comprehensive arrangement of a protective envelope in a building room is possible, without the outer appearance of such rooms changing and without impeding or hindering persons working in said room.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
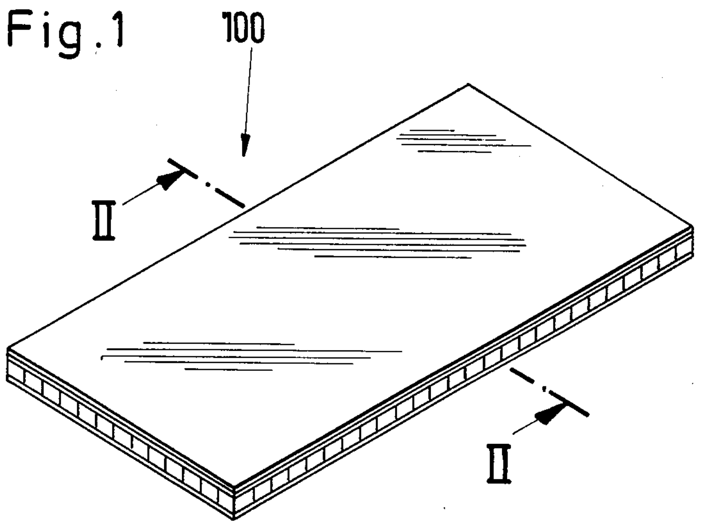
FIG. 1: a diagrammatic view of a retroreflector.
Figure 2:
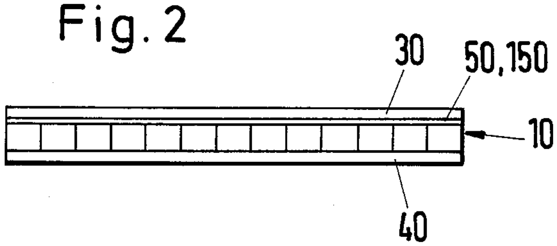
FIG. 2: the retroreflector in a vertical sectional representation along line II—II of FIG. 1.

In FIGS. 1 and 2, the flat article is designated 100 and comprises a base layer 10 on which are placed filter coatings formed either as foils 50 or as evaporation deposited coatings 150. The corresponding top coatings 30, 40, which serve as absorption coatings, are placed on the top surface **10*b* and bottom surface 10*a* of the base layer 10**.

Figure 3:
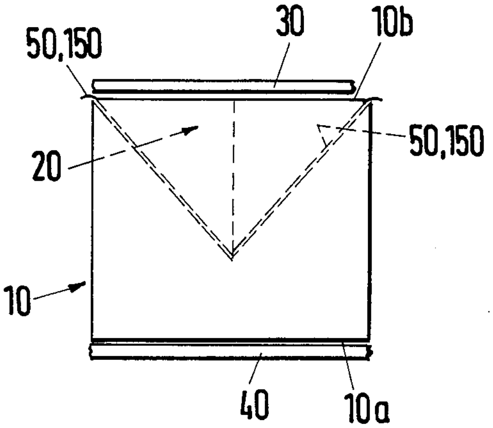
FIG. 3: a reflection element in a larger-scale detail.
Figure 4:
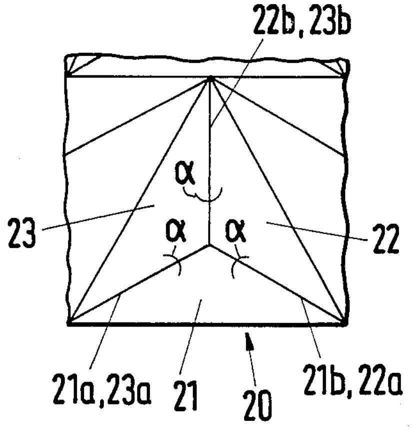
FIG. 4: the reflection element according to FIG. 3 in a view from above.

FIGS. 3 and 4 show a reflector element 20 from base layer 10, and the reflector element 20 being formed in the latter by, for example, deep drawing. Reflector element 20 is constructed as an indentation or retraction in base layer 10, said indentation being constructed in pyramidal point-like manner with three boundary faces 21, 22, 23. The latter are provided on their engaging edges **21*a*, 23*a*; 21*b*, 22*a*; 22*b*, 23*b* with a reciprocal angle of precisely $\alpha=90°$. As a result of this arrangement of the limiting or indentation faces, a total reflection of the incident electromagnetic radiation is ensured. In the vicinity of reflector elements 20, filter coatings 50, 150 are provided covering the boundary faces 21, 22, 23 or are produced thereon by evaporation deposition. As shown by FIGS. 1 and 2, reflectors 20 in base layer 10 are directly juxtaposed, so that a difficultly traversable layer for the electromagnetic radiation is formed, on which layer 10, the additional filter coatings 50, 150 are arranged. At the top, base layer 10 is covered by top coating 30, which is constructed in such a way that wallpaper may be stuck or emulsion may be applied thereto. The lower top coating 40 can be applied to walls, floors or ceilings with a conventional wallpaper paste or some other suitable adhesive, but can also be provided with a self-adhesive coating. It is also possible to incorporate reinforcements into the base layer 10 ensuring that the flat article 100** can absorb corresponding static or dynamic loads.

What is claimed is:

1. A retroreflector for reflecting electromagnetic rays, said retroreflector being suitable for destroying, by reflection or absorption, electromagnetic radiation which could be detrimental to magnetic or other data carriers, said retroreflector being constructed as a flat article comprising:

a base layer formed from metal in the form of a metal foil or sheet, said baselayer having juxtaposed reflectors formed therein as pyramidal point-like indentations or retractions with three boundary faces juxtaposed therein without gaps, said boundary faces forming 90° angles therebetween at engaging edges thereof, filter coatings, made from chromium, brass, silver and/or Mumetal, being applied, as a prefrabricated foil or by evaporation deposition, on the boundary faces of the juxtaposed reflectors, said filter coatings having such a thickness that is suitable for broadband filtering of X, S and VHF band waves; and top coatings applied to an upper surface and a lower surface of said base layer, said top coatings being substantially planar and made from plastic, metal or precious metal suitable for absorbing electromagnetic radiation, said top coatings being applied as prefabricated foils or by evaporation deposition, wherein, for arranging on building walls and ceilings, said flat article is formed as a surface-covering foil web in which the top coating on the lower surface is suitable for application to a wall while said top coating on said upper surface is suitable for receiving wallpaper or an emulsion.

2. A retroreflector for reflecting electromagnetic rays, said retroreflector being suitable for destroying, by reflection or absorption, electromagnetic radiation which could be detrimental to magnetic or other data carriers, said retroreflector being constructed as a flat article comprising:

a base layer formed from metal in the form of a metal foil or sheet, said baselayer having juxtaposed reflectors formed therein as pyramidal point-like indentations or retractions with three boundary faces juxtaposed therein without gaps, said boundary faces forming 90° angles therebetween at engaging edges thereof, filter coatings, made from chromium, brass, silver and/or Mumetal, being applied, as a prefabricated foil or by evaporation deposition, on the boundary faces of the juxtaposed reflectors, said filter coatings having such a thickness that is suitable for broadband and filtering of X, S and VHF band waves; and top coatings applied to an upper surface and a lower surface of said base layer, said top coatings being substantially planar and made from plastic, metal or precious metal suitable for absorbing electromagnetic radiation, said top coatings being applied as prefabricated foils or by evaporation deposition, wherein, for arranging on building floors, said flat article is formed as a surface-covering foil web in which the top coating on said lower surface is suitable for application and fixing to said floors, and said top coating on said upper surface is suitable for receiving a carpet pile, said base layer being constructed for absorbing static loading forces without damage thereto.

* * * * *